(12) United States Patent
Park (10) Patent No.: US 9,313,351 B2
(45) Date of Patent: Apr. 12, 2016

(54) POWER CONTROL APPARATUS AND IMAGE FORMING APPARATUS INCLUDING THE SAME

(71) Applicant: Samsung Electronics Co., Ltd., Suwon-si, Gyeonggi-do (KR)

(72) Inventor: Kwang Sung Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 19 days.

(21) Appl. No.: 13/655,942

(22) Filed: Oct. 19, 2012

(65) Prior Publication Data

US 2013/0101306 A1    Apr. 25, 2013

(30) Foreign Application Priority Data

Oct. 19, 2011 (KR) .......................... 10-2011-0107088

(51) Int. Cl.
G03G 21/14    (2006.01)
H04N 1/00    (2006.01)
G03G 15/00    (2006.01)

(52) U.S. Cl.
CPC ....... *H04N 1/00891* (2013.01); *G03G 15/5008* (2013.01); *G03G 2215/00978* (2013.01)

(58) Field of Classification Search
CPC ................. G03G 2215/0043; G03G 15/5008; H04N 1/00891
USPC ........................................................... 399/89
See application file for complete search history.

(56) References Cited

U.S. PATENT DOCUMENTS

| 6,072,585 | A * | 6/2000 | Dutton et al. ................. 358/1.12 |
| 2003/0009702 | A1 | 1/2003 | Park |
| 2007/0277048 | A1* | 11/2007 | Yamasaki ....................... 713/310 |
| 2009/0091182 | A1 | 4/2009 | Tamada et al. |
| 2010/0014897 | A1* | 1/2010 | Seto et al. ...................... 399/307 |
| 2011/0052243 | A1* | 3/2011 | Suzuki ............................. 399/88 |
| 2011/0072281 | A1* | 3/2011 | Song et al. ..................... 713/300 |

(Continued)

FOREIGN PATENT DOCUMENTS

| JP | 3-56067 | 3/1991 |
| JP | 2003-266878 | 9/2003 |

OTHER PUBLICATIONS

Tod E. Kurt (todbot blog post "Momentary Button as on/off toggle using 555", dated Jan. 2, 2010, http://todbot.com/blog/2010/01/02/momentary-button-as-onoff-toggle-using-555/).*

(Continued)

*Primary Examiner* — Clayton E LaBalle
*Assistant Examiner* — Leon W Rhodes, Jr.
(74) *Attorney, Agent, or Firm* — Staas & Halsey LLP (57) ABSTRACT

A power control apparatus and an image forming apparatus including the same are disclosed. The power control apparatus can directly enable or disable a DC/DC converter for converting reference DC power to a secondary DC power without an additional microcomputer based power circuit by connecting an enable or disable operation of the DC/DC converter with an operation of a power button by a user. Accordingly, the number of components of a power control circuit can be reduced to decrease material cost and simplify the power control circuit. Furthermore, the power control apparatus and the image forming apparatus including the same can reduce unnecessary power consumption in a system off state.

19 Claims, 9 Drawing Sheets

(56) References Cited

U.S. PATENT DOCUMENTS

2011/0081160 A1* 4/2011 Yoon et al. .................. 399/88
2011/0187440 A1* 8/2011 Yamaguchi ................ 327/482

OTHER PUBLICATIONS

Linear Technologies LTC 2953 documentation (datasheet, design notes, design features, and press release).*

Extended European Search Report dated Apr. 24, 2013 in corresponding European Patent Application No. 12189289.7.
Lattice Semiconductor Corporation, "Interfacing the ispPAC-POWR1208 with Modular DC-to-DC Converters", XP-002695362, Jan. 2003, 7 pages.

* cited by examiner

<power off state>

<attempt to power off>

FIG. 8

| nKEY_POWER | nPOWER_OFF |
|---|---|
| 3.3V | Low |
| 0V | High |

FIG. 9

POWER CONTROL APPARATUS AND IMAGE FORMING APPARATUS INCLUDING THE SAME

CROSS-REFERENCE TO RELATED APPLICATIONS

This application claims the priority benefit of Korean Patent Application No. 2011-107088, filed on Oct. 19, 2011 in the Korean Intellectual Property Office, the disclosure of which is incorporated herein by reference.

BACKGROUND

1. Field

Embodiments relate to a power control apparatus and an image forming apparatus including the same and, more particularly, to a power control apparatus capable of minimizing unnecessary power consumption during power off of an image forming apparatus, and an image forming apparatus including the same.

2. Description of the Related Art

An image forming apparatus includes a printer, a copier, a facsimile machine, and a multi-purpose peripheral apparatus having a combination of the functions of the printer, copier and facsimile.

The image forming apparatus provides power to a controller and principal components thereof using a power supply, a DC/DC converter, etc. Specifically, the power supply converts alternating current (AC) power provided by an external power source into primary direct current (DC) power. The DC/DC converter generates secondary DC power used for the controller that controls the image forming apparatus and internal components of the image forming apparatus using the DC power.

While other power converters such as a regulator can replace the DC/DC converter, a DC/DC converter having high power conversion efficiency is increasingly used in order to minimize power consumption of the image forming apparatus and save energy.

A recent image forming apparatus adopts a scheme of converting AC power to a DC voltage and then converting the DC voltage into secondary DC voltages having different levels using the DC/DC converter.

In general, the DC/DC converter includes an enable pin through which the DC/DC converter can be enabled or disabled by an external signal. The DC/DC converter is activated (or enabled) or inactivated (shut down or disabled) according to the level of a signal input to the enable pin.

A microcomputer-based power control circuit is additionally provided to control activation or inactivation of the DC/DC converter in such a manner that a signal having an appropriate voltage level is applied to the enable pin of the DC/DC converter. Accordingly, when the image forming apparatus is powered off, unnecessary power consumption is minimized by disabling the DC/DC converter using the microcomputer-based power control circuit.

However, a conventional power control apparatus additionally includes the microcomputer-based power control circuit for controlling activation or inactivation of the DC/DC converter, and thus the number of components of the power control apparatus increases, raising manufacturing costs and complicating the configuration of the power control circuit.

Furthermore, since the microcomputer-based power control circuit needs to be continuously provided with power even when the image forming apparatus is powered off, unnecessary power consumption still occurs.

SUMMARY

In accordance with an aspect of one or more embodiments, there is provided a power control apparatus capable of controlling activation/inactivation of a DC/DC converter without using an additional microcomputer-based power control circuit and an image forming apparatus including the same.

In accordance with an aspect of one or more embodiments, there is provided a power control apparatus including a DC/DC converter including an enable pin and being enabled or disabled according to a level of a signal input to the enable pin, a switch connected to the enable pin and switched to change the level of the signal input to the enable pin, and an input unit connected to one terminal of the switch and including a power button to control a switching state of the switch.

The power control apparatus may further include a trigger unit to divide a DC power into a reference voltage and output a trigger signal for turning on the switch such that a signal for disabling the DC/DC converter is input to the enable pin in case of power off.

The power control apparatus may further include a CPU to recognize an operation of the power button and a power controller to control the switching state of the switch according to a control signal of the CPU.

The power controller may include a logic OR gate to receive a signal for powering off a system and a reset signal from the CPU as inputs and a transistor switched according to the output signal of the logic OR gate.

The transistor may include a collector connected to an output terminal of the trigger unit and an emitter grounded.

One terminal of the power button may be connected to the collector of the transistor and the other terminal thereof may be ground.

The power control apparatus may further include a barrier diode connected in a forward direction to a circuit line that connects the collector of the transistor and one terminal of the power button.

The power control apparatus may further include a diode connected in a forward direction to a circuit line that connects the trigger unit and the switch to prevent the DC/DC converter from being disabled when the switch is turned on according to an ON operation of the power button when the system is changed from a power off state to a power on state.

In accordance with an aspect of one or more embodiments, there is provided a power management (control) apparatus including a DC/DC converter including an enable pin and being enabled or disabled according to a level of a signal input to the enable pin, a switch to apply a first voltage level signal for disabling the DC/DC converter to the enable pin when turned on and to apply a second voltage level signal to the enable pin when turned off, a trigger unit connected to one terminal of the switch to divide a DC power into a reference voltage and to tune on the switch such that the first voltage level signal is input to the enable pin in a power off state of a system, an input unit connected to one terminal of the switch and including a power button to control a switching state of the switch, a CPU to recognize an operation state of the power button of the input unit, and a power controller to control the switching state of the switch according to a control signal of the CPU.

The trigger unit may turn on the switch to disable the DC/DC converter in the power off state of the system, the CPU may turn off the switch through the power controller to enable the DC/DC converter when the power button is pressed in the power off state of the system, and the CPU may control the trigger unit to turn on the switch through the power controller to disable the DC/DC converter when the power button is pressed in a power on state of the system.

In an aspect of one or more embodiments, there is provided an image forming apparatus including a photosensitive member, an optical scanning unit to form an electrostatic latent image on the photosensitive member, a developing unit to develop the electrostatic latent image formed on the photosensitive member into a developer image, a transfer unit to transfer the developer image formed on the photosensitive member to a printing medium, a fusing unit to fusing the developer image transferred by the transfer unit onto the printing medium, a control board to control an operation of at least one of the photosensitive member, optical scanning unit, developing unit, transfer unit and fusing unit, and a power control apparatus to supply power to at least one of the components, wherein the power control apparatus includes a DC/DC converter including an enable pin and being enabled or disabled according to a level of a signal input to the enable pin, a switch connected to the enable pin and switched to change the level of the signal input to the enable pin, and an input unit connected to one terminal of the switch and including a power button to control a switching state of the switch.

The image forming apparatus may further include a trigger unit to divide a DC power into a reference voltage and output a trigger signal for turning on the switch such that a signal for disabling the DC/DC converter is input to the enable pin in case of power off.

The image forming apparatus may further include a CPU to recognize an operation of the power button and a power controller to control the switching state of the switch according to a control signal of the CPU.

The power controller may include a logic OR gate to receive a signal for powering off a system and a reset signal from the CPU as inputs and a transistor switched according to the output signal of the logic OR gate.

The transistor may include a collector connected to an output terminal of the trigger unit and an emitter grounded.

One terminal of the power button may be connected to the collector of the transistor and the other terminal thereof may be ground.

The image forming apparatus may further include a barrier diode connected in a forward direction to a circuit line that connects the collector of the transistor and one terminal of the power button.

The image forming apparatus may further include a diode connected in a forward direction to a circuit line that connects the trigger unit and the switch to prevent the DC/DC converter from being disabled when the switch is turned on according to an ON operation of the power button when the system is changed from a power off state to a power on state.

According to an aspect of one or more embodiments, the DC/DC converter can be disabled without an additional microcomputer based power control circuit in a power off state of the image forming apparatus by connecting activation/inactivation of the DC/DC converter with operation of the power button. When the power off state is changed to a power on state, the DC/DC converter can be enabled according to an operation of the user of pressing the power button. When the power on state is changed to the power off state, the DC/DC converter can be disabled according to an operation of the user of releasing the power button. Accordingly, the number of components of the power control circuit can be reduced to decrease material cost and simplify the configuration of the power control circuit. Furthermore, unnecessary power consumption can be reduced in case of system power off.

In accordance with one or more embodiments, there is provided an image forming apparatus including a photosensitive member; an optical scanning unit to form an electrostatic latent image on the photosensitive member; a developing to develop the electrostatic latent image formed on the photosensitive member into a developer image; a transfer unit to transfer the developer image formed on the photosensitive member to a printing medium; a fusing unit to fuse the developer image transferred by the transfer unit onto the printing medium; a control board to control an operation of at least one of the photosensitive member, optical scanning unit, developing unit, transfer unit and fusing unit; and a power control apparatus to supply power to at least one of the components, wherein the power control apparatus includes a DC/DC converter including an enable pin and being enabled or disabled according to a level of a signal input to the enable pin; a switch to apply a first voltage level signal for disabling the DC/DC converter to the enable pin when turned on and to apply a second voltage level signal to the enable pin when turned off; a trigger unit connected to one terminal of the switch to divide a DC power into a reference voltage and to tune on the switch such that the first voltage level signal is input to the enable pin in a power off state of a system; an input unit connected to one terminal of the switch and including a power button to control a switching state of the switch; a central processing unit (CPU) to recognize an operation state of the power button of the input unit; and a power controller to control the switching state of the switch according to a control signal of the CPU.

The trigger unit may turn on the switch to disable the DC/DC converter in the power off state of the system, the CPU may turn off the switch through the power controller to enable the DC/DC converter when the power button is pressed in the power off state of the system, and the CPU may control the trigger unit to turn on the switch through the power controller to disable the DC/DC converter when the power button is pressed in a power on state of the system.

In accordance with one or more embodiments, there is provided an image forming apparatus including a photosensitive member; an optical scanning unit to form an electrostatic latent image on the photosensitive member; a developing unit to develop the electrostatic latent image formed on the photosensitive member into a developer image; a transfer unit to transfer the developer image formed on the photosensitive member to a printing medium; a fusing unit to fuse the developer image transferred by the transfer unit onto the printing medium; a control board to control an operation of at least one of the photosensitive member, optical scanning unit, developing unit, transfer unit and fusing unit; and a power control apparatus to supply power to at least one of the components, wherein the power control apparatus includes a DC/DC converter including an enable pin and being enabled or disabled according to a level of a signal input to the enable pin; a switch connected to the enable pin and switched to change the level of the signal input to the enable pin; an input unit connected to one terminal of the switch; and a kick start unit connected to the input unit to automatically enable the image forming apparatus when alternating current (AC) power is supplied to the image forming apparatus.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout.

An image forming apparatus may be a color image forming apparatus for convenience of description.

Figure 1:
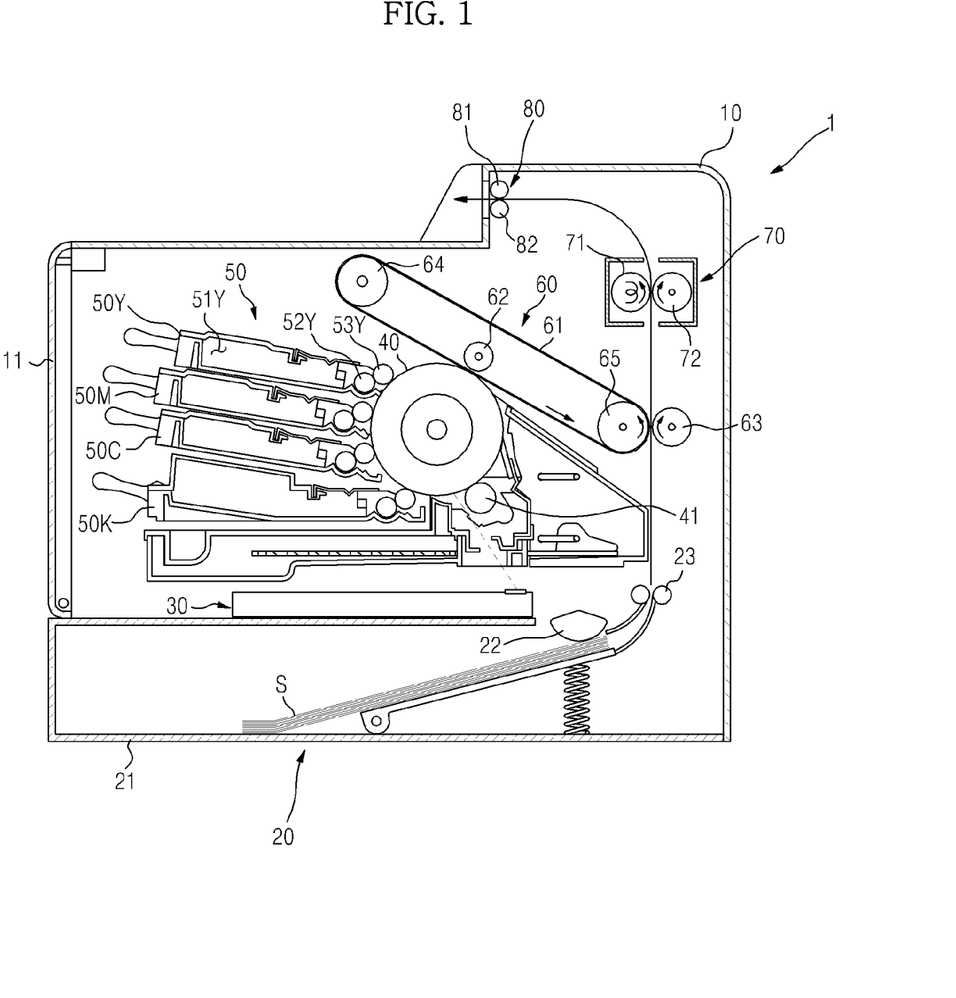
FIG. 1 illustrates the configuration of an image forming apparatus to which a power control apparatus according to an embodiment.

FIG. 1 illustrates the configuration of an image forming apparatus 1 according to an embodiment.

Referring to FIG. 1, the image forming apparatus 1 may include a main body 10, a printing medium feeding unit (printing medium feeder) 20, an image forming unit 30, 40, 50 and 60, a fusing unit 70, and a printing medium discharging unit 80.

The main body 10 forms the appearance of the image forming apparatus 1 and supports components provided therein. A main body cover 11 is rotatably attached to one side of the main body 10 and opens/closes part of the main body 10.

The printing medium feeding unit 20 feeds printing media to the image forming unit 30, 40, 50 and 60. The printing medium feeding unit 20 includes a cassette 21 storing the print media S, a pick-up roller 22 for picking up the print media S stored in the cassette 21 one by one, and a transfer roller 23 for transferring the picked up print media to a transfer unit 60.

The image forming unit 30, 40, 50 and 60 forms an image to be printed on a printing medium and includes an optical scanning unit 30, a photosensitive member 40, a developing unit 50, and the transfer unit 60.

The optical scanning unit 30 is located under the developing unit 50 and scans the photosensitive member 40 with light corresponding to image information to form an electrostatic latent image on the surface of the photosensitive member 40.

The photosensitive member 40 is constructed in such a manner that an optical conductive layer is formed on the surface of a cylindrical metal drum. The photosensitive member 40 forms an electrostatic latent image according to the optical scanning unit 30 and forms a developer image according to the developing unit 50. A charging roller 41 is set in the main body 10. The charging roller 41 charges the photosensitive member 40 to a predetermined potential before the optical scanning unit 30 scans the photosensitive member 40 with light. The charging roller 41 is an exemplary charger that charges the photosensitive member 40 to a uniform potential.

The charging roller 41 supplies charges to the photosensitive member 40 while rotating in contact or without contact with the outer surface of the photosensitive member 40 to charge the outer surface of the photosensitive member 40 to a uniform potential.

The developing unit 50 supplies a developer to the photosensitive member 40 on which the electrostatic latent image is formed so as to form a developer image. The developing unit 50 may include four developer cartridges 50Y, 50M, 50C and 50K respectively containing developers in different colors, for example, yellow (Y), magenta (M), cyan (C) and black (K). The developer cartridges 50Y, 50M, 50C and 50K respectively include developer containers 51Y, 51M, 51C and 51K, feeding rollers 52Y, 52M, 52C and 52K, and developing rollers 53Y, 53M, 53C and 53K. The developer containers 51Y, 51M, 51C and 51K contain developers to be supplied to the photosensitive member 40. The feeding rollers 52Y, 52M, 52C and 52K supply the developers contained in the developer containers 51Y, 51M, 51C and 51K to the developing rollers 53Y, 53M, 53C and 53K. The developing rollers 53Y, 53M, 53C and 53K attach the developers onto the surface of the photosensitive member 40 to form a developer image.

The transfer unit 60 includes a transfer belt 61, a first transfer roller 62 and a second transfer roller 63. The developer image formed on the surface of the photosensitive member 40 is transferred to the transfer roller 61. The transfer roller 61 is supported by supporting rollers 64 and 65 and runs at the same velocity as the linear velocity of the photosensitive member 40. The first transfer roller 62 faces the photosensitive member 40 with the transfer belt 61 located therebetween to transfer the developer image formed on the surface of the photosensitive member 40 to the transfer belt 61. The second transfer roller 63 faces the supporting roller 65 with the transfer belt 61 located therebetween. The second transfer roller 63 is separated from the transfer belt 61 while the developer image is transferred from the photosensitive member 40 to the transfer belt 61 and comes into contact with the transfer belt 61 at a predetermined pressure upon completion of transfer of the developer image from the photosensitive member 40 to the transfer belt 61. When the second transfer roller 63 comes into contact with the transfer belt 61, the image of the transfer belt 61 is transferred to a printing medium.

The fusing unit 70 fuses the developer image onto the printing medium and then delivers the printing medium onto which the developer image is fused to the printing medium discharging unit 80. The fusing unit 70 includes a heating roller 71 having a heat source and a pressure roller 72 located opposite to the heating roller 71. When the printing medium passes between the heating roller 71 and the pressure roller 72, the developer image is fixed onto the printing medium by heat from the heating roller 71 and pressure acting between the heating roller 71 and the pressure roller 72.

The printing medium discharging unit 80 includes a discharging roller 81 and a discharge backup roller 82 and discharges the printing medium that has passed through the fusing unit 70 to the outside of the main body 10.

Operations of the image forming apparatus having the above-mentioned configuration are briefly described.

The optical scanning unit 30 scans the photosensitive member 40 charged to a uniform potential by the charging roller 41 with light corresponding to yellow image information, for example, to form an electrostatic latent image corresponding to the yellow image information on the photosensitive member 40.

A developing bias is applied to the developing roller 53Y of the yellow developer cartridge 50Y such that the yellow developer is attached to the electrostatic latent image to form a yellow developer image on the photosensitive member 40. This developer image is transferred to the transfer belt 61 by the first transfer roller 62.

Upon completion of transfer of a yellow developer image corresponding to one page, the optical scanning unit 30 scans the photosensitive member 40 with light corresponding to magenta image information, for example, to form an electrostatic latent image corresponding to the magenta image information on the photosensitive member 40.

The magenta developer cartridge 50M feeds the magenta developer to the electrostatic latent image to develop the electrostatic latent image such that a magenta developer image is formed on the photosensitive member 40. The magenta developer image formed on the photosensitive member 40 is transferred to the transfer belt 61 such that the magenta developer image is superimposed on the previously transferred yellow developer image.

The above-mentioned process is performed on cyan and black image information to form a color developer image including yellow, magenta, cyan and black developer images formed in a superimposed manner on the transfer belt 61. The color developer image is transferred to a printing medium passing between the transfer belt 61 and the second transfer roller, and the image transferred to the printing medium is fused onto the printing medium while passing through the fusing unit 70. The printing medium that has passed through the fusing unit 70 is discharged by the printing medium discharging unit 80.

A power control apparatus according to an embodiment supplies power to at least one of the feeding unit 20, the image forming unit 30, 40, 50 and 60, the fusing unit 70 and the discharging unit 80, which are components of the image forming apparatus, and a control board on which various circuit elements are mounted to control the image forming apparatus.

Figure 2:
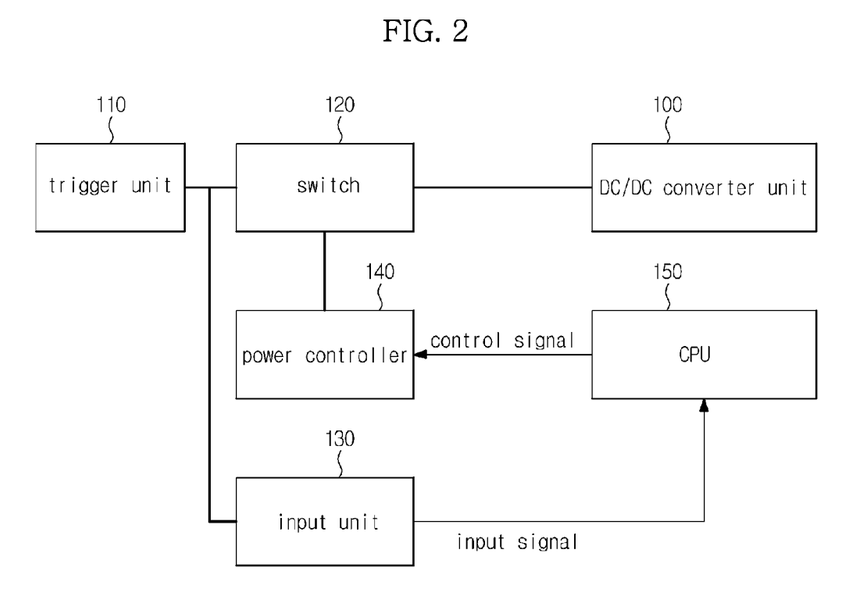
FIG. 2 is a block diagram of the power control apparatus according to an embodiment.

FIG. 2 is a block diagram of the power control apparatus according to an embodiment.

As shown in FIG. 2, the power control apparatus includes a DC/DC converter unit 100, a trigger unit (trigger) 110, a switch 120, an input unit 130, a power controller 140 and a central processing unit (CPU) 150.

The DC/DC converter unit 100 is enabled or disabled according to a switching operation of the switch 120.

The switch 20 is turned on or turned off according to a trigger signal of the trigger unit 110.

The input unit 130 includes a power button operated by a user. When the power button is pressed in order to change a system off state to a system on state, the level of the trigger signal input to the switch 120 from the trigger unit 110 is decreased, for example, to 0V from 3.3V, to turn off the switch 120, thereby enabling the DC/DC converter unit 100. Furthermore, the input unit 130 outputs an input signal corresponding to the operation state of the power button operated by the user to the CPU 150.

The power controller 140 turns the switch 120 on or off by changing the level of the trigger signal input to the switch 120 from the trigger unit 110 according to a control signal of the CPU 150. In addition, the power controller 140 may maintain the enable state of the DC/DC converter unit 100 even when the power button of the input unit 130 is released.

The CPU 150 recognizes whether the user turns the power button on or off according to the input signal from the input unit 130. The CPU 150 outputs the control signal for controlling the operation of the power controller 140 according to the recognition result.

Figure 3:
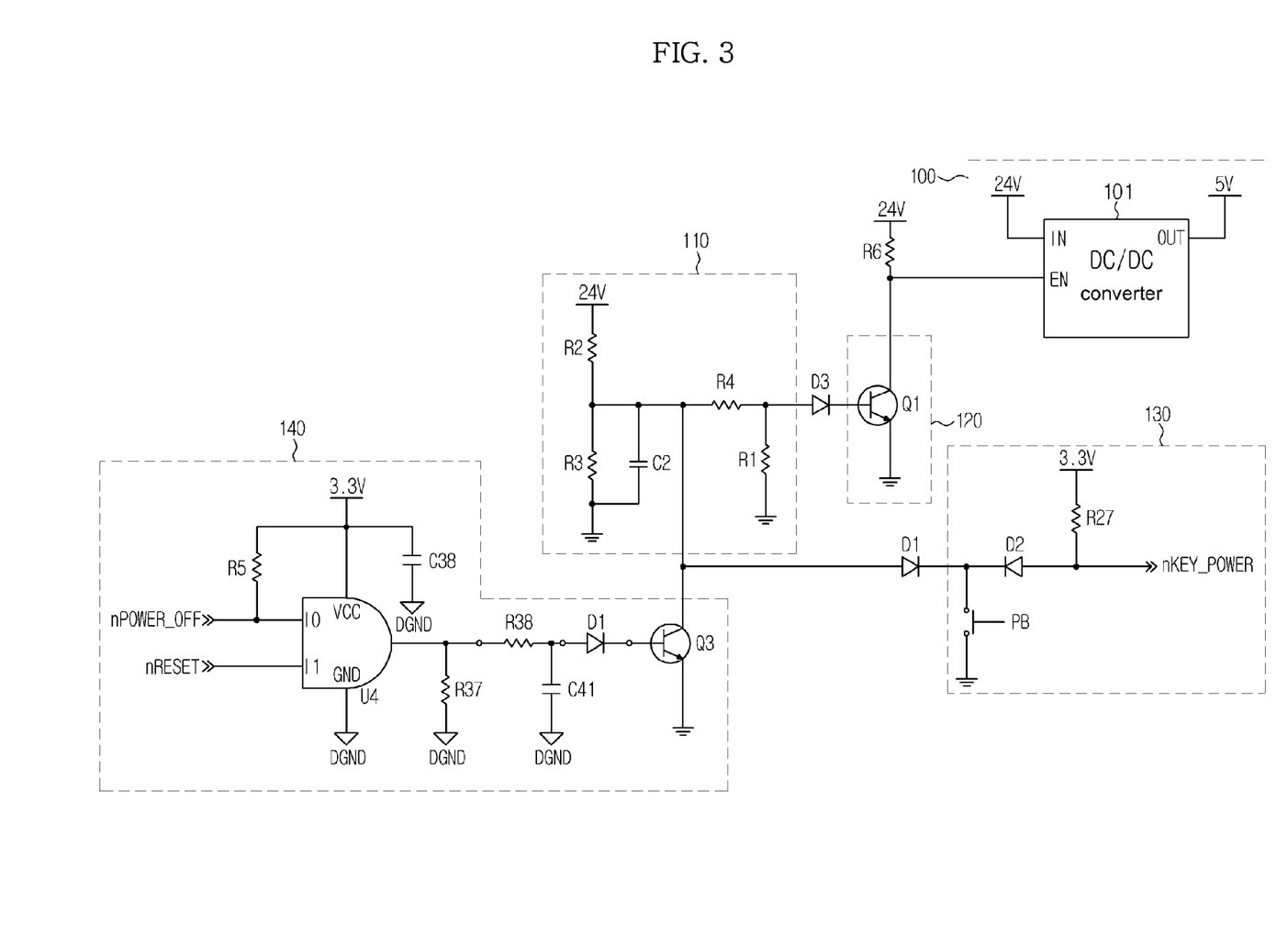
FIG. 3 is a circuit diagram of the power control apparatus according to an embodiment.

FIG. 3 is a circuit diagram of the power control apparatus according to an embodiment.

As shown in FIG. 3, the DC/DC converter unit 100 includes a DC/DC converter 101 for converting a primary DC power (e.g. 24V) changed from AC power supplied to a system such as an image forming apparatus to a secondary DC power (e.g. 5V). The DC/DC converter 101 includes an enable pin EN though which the DC/DC converter 101 is enabled or disabled according to an external signal input to the enable pin EN.

Figure 4:
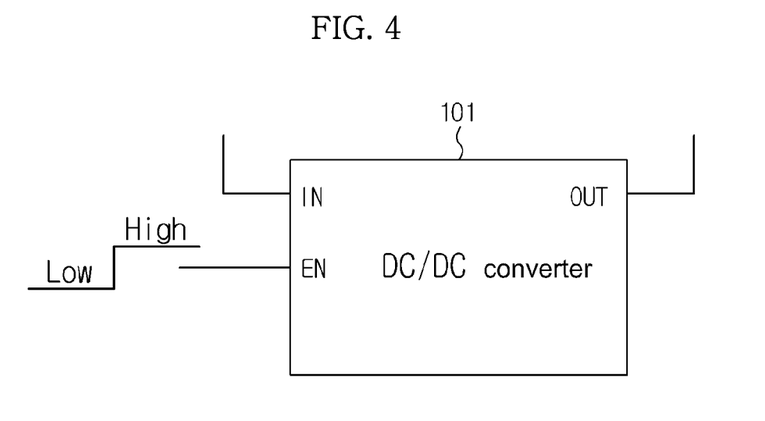
FIG. 4 illustrates a DC/DC converter enable pin in the power control apparatus according to an embodiment.

The DC/DC converter 101 is disabled when the enable pin EN is grounded. Conversely, the DC/DC converter 101 is enabled when the enable pin EN is open or the primary DC power (e.g. 24V) is applied to the enable pin EN as pull-up (refer to FIG. 4).

When the DC/DC converter 101 is enabled, the DC/DC converter 101 generates the secondary DC power (e.g. 5V) necessary to operate components of the image forming apparatus, such as a control board, from the primary DC power (e.g. 24V) and provides the secondary DC power. Particularly, when power is supplied to the CPU 150 that is a microprocessor for controlling the image forming apparatus, the CPU 150 is enabled to supply a control signal necessary for a peripheral circuit.

The trigger unit 110 divides the primary DC power, 24V, supplied from a power supply, and outputs a trigger signal with respect to the divided voltage. For example, the trigger unit 110 divides the primary DC power, 24V, into 3.3V and outputs a trigger signal for 3.3V. The switch 120 is turned on or turned off according to the level of the trigger signal.

The switch 120 is connected to the enable pin EN of the DC/DC converter 101 and grounds or opens the enable pin EN, or connects the primary DC power to the enable pin EN as pull-up power according to a switching operation thereof so as to enable or disable the DC/DC converter 101.

To achieve this, the switch 120 includes a transistor Q1 as a switching element. The transistor Q1 may be an NPN transistor. The NPN transistor is constructed in such a manner that a P type single-crystalline semiconductor is interposed between N type semiconductors and includes an emitter formed of an N type semiconductor material, a base made of a P type semiconductor material and a collector formed of an N type semiconductor material.

The transistor Q1 is turned on when 3.3V is applied to the base thereof, and thus the collector and the emitter thereof are short-circuited. Conversely, when 0V is applied to the base, the transistor Q1 is turned off and thus the collector and emitter thereof are open.

Figure 5:
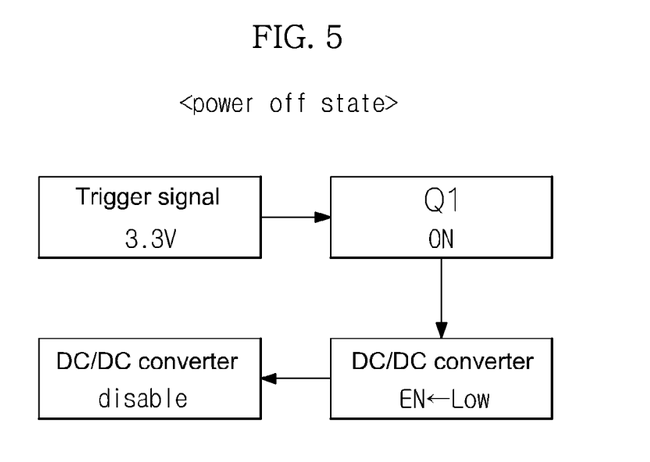
FIG. 5 illustrates a power-off state operation of the power control apparatus according to an embodiment.

As shown in FIG. 5, in a power off state of the image forming apparatus, the transistor Q1 of the switch 120 is turned on according to the trigger signal of the trigger unit 110 for 3.3V. Upon turning on the transistor Q1, the enable pin EN of the DC/DC converter 101 is grounded, and thus a low signal is input to the DC/DC converter 101 through the enable pin EN to disable the DC/DC converter 101.

Referring back to FIG. 3, the input unit 130 includes a power button PB used to power the image forming apparatus on or off. The power button PB is a push button and is open in a power off state. When the power button PB is not pressed, a voltage level of an nKEY_POWER signal input to the CPU 150 is 3.3V. When the power button PB is pressed, the voltage level of the nKEY_POWER signal input to the CPU 150 changes to 0V from 3.3V. The CPU 150 determines whether the user presses the power button PB on the basis of this variation in the nKEY_POWER signal.

In case of power off, 3.3V is supplied from the trigger unit 110 to the switch 120 since the power button PB is open.

Accordingly, the transistor Q1 of the switch 120 is turned on, and thus the enable pin EN of the DC/DC converter 101 is grounded to disable the DC/DC converter 101. That is, the operation of the DC/DC converter 101 is stopped in case of power off.

Figure 6:
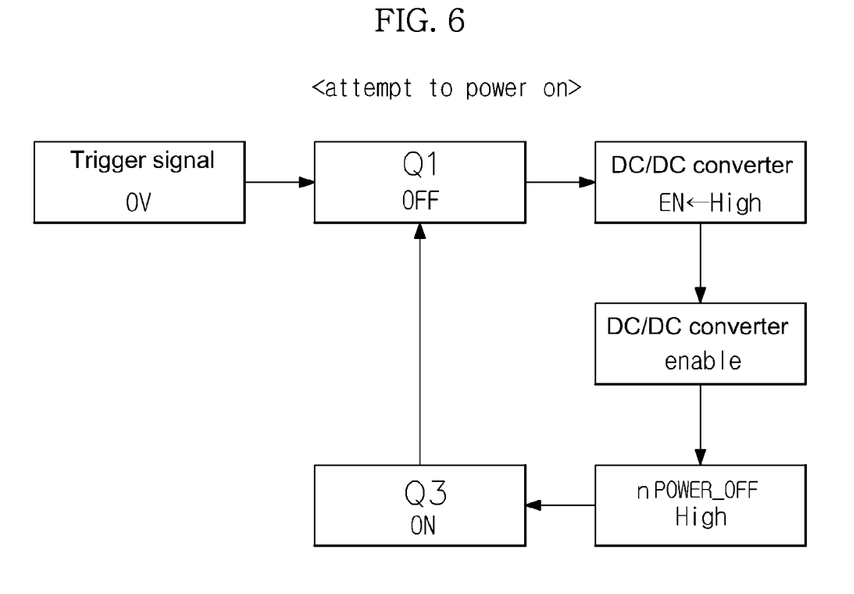
FIG. 6 illustrates a power-on operation in a power off state in the power control apparatus according to an embodiment.

Referring to FIG. 6, if the user presses the power button PB of the input unit 130 when the image forming apparatus is powered off, the power button PB is grounded to allow trigger current of the trigger unit 110 to flow to the ground through the power button PB, and thus the trigger voltage input to the switch 120 from the trigger unit 110 decreases to 0V from 3.3V. Accordingly, the transistor Q1 of the switch 120 is turned off. In this case, 24V pull-up is applied to the enable pin EN of the DC/DC converter 101 and thus a high signal is input to the DC/DC converter 101 so as to change the disable state of the DC/DC converter 101 to the enable state. That is, the DC/DC converter 101 operates to generate the secondary DC voltage, 5V, from the primary DC voltage, 24V, applied to an input pin IN thereof and outputs 5V through an output pin OUT thereof. Upon activation of the DC/DC converter 101, power is supplied to the CPU 150 and thus an nPOWER_OFF signal input to the power controller 140 from the CPU 150 becomes a high signal. Accordingly, a transistor Q3 of the power controller 140 is turned on to maintain the turn off state of the transistor Q1 of the switch 120, and thus the DC/DC converter 101 maintains the enable state thereof.

Figure 7:
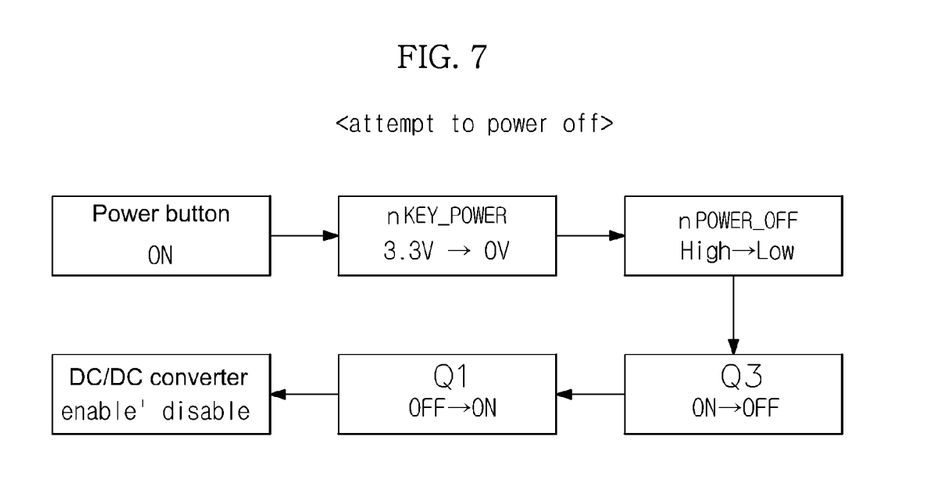
FIG. 7 illustrates a power-off operation in a power-on state in the power control apparatus according to an embodiment.

Referring to FIG. 7, if the power button PB is pressed when the image forming apparatus is powered on, the nKEY_POWER signal input to the CPU 150 changes from 3.3V to 0V to inform the CPU 150 that the power button PB is pressed. When the power button PB is continuously pressed for a predetermined time, the CPU 150 recognizes it as a command for turning off the image forming apparatus according to a predetermined program. When the user releases the pressed power button PB of the input unit 130, the CPU 150 changes the nPOWER_OFF signal to a low signal (0V) and supplies the low signal to the power controller 140.

In this case, the transistor Q1 of the switch 120 is turned off to disable the DC/DC converter 101. That is, power supply to the DC/DC converter 101 is cut off to interrupt the operation of the DC/DC converter 101.

Figure 8:
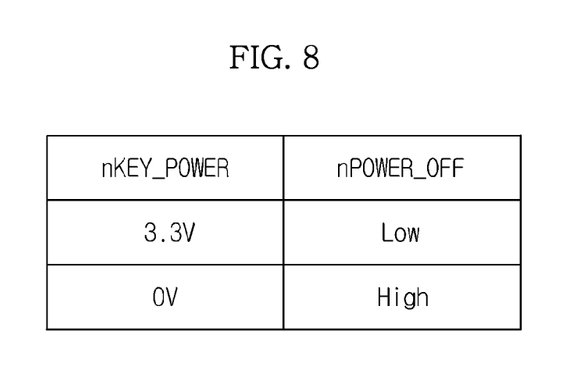
FIG. 8 is a table for explaining output of a control signal for controlling operations of a DC/DC converter by a CPU of the power control apparatus according to input signal.

Referring to FIG. 8, when nKEY_POWER signal is 3.3V, the CPU 150 determines that the power button PB is pressed and outputs the nPOWER_OFF signal at a low level to the power controller 140 to turn off the image forming apparatus. Conversely, when nKEY_POWER signal is 0V, the CPU 150 determines that the power button PB is released and outputs the nPOWER_OFF signal at a high level to the power controller 140 to turn on the image forming apparatus.

The power controller 140 turns on or turns off the DC/DC converter 101 according to the nPOWER_OFF signal output from the CPU 150. The power controller 140 is connected to the trigger unit 110 and turns the transistor Q1 of the switch 120 off or on by adjusting the voltage supplied to the switch 120 from the trigger unit 110 so as to turn the DC/DC converter 101 on or off.

Referring back to FIG. 3, the power controller 140 includes a logic OR gate U4 and the transistor Q3. The logic OR gate U4 receives the nPOWER_OFF signal and an nRESET signal output from the CPU 150, as input signals. The logic OR gate U4 outputs 3.3V when both the nPOWER_OFF signal and nRESET signal output from the CPU 150 are high (5V) and outputs 0V if one of the two signals is low (0V). The transistor Q3 is turned on or turned off according to the voltage level of the output signal of the logic OR gate U4. That is, the transistor Q3 is turned on when the voltage level of the output signal of the logic OR gate U4 is 3.3V and turned off when 0V.

When the user presses the power button PB of the input unit 130 in a power off state of the image forming apparatus, the CPU 150 is enabled to output the nPOWER_OFF signal at a high level. In this case, the transistor Q3 of the power controller 140 is turned on to turn off the transistor Q1 of the switch 120, and the enable pin EN of the DC/DC converter 120 is provided with 24V to enable the DC/DC converter 101. In this case, even when the user releases the power button PB, the DC/DC converter 101 keeps the enable state thereof because the nPOWER_OFF signal supplied to the power controller 140 from the enabled CPU 150 is a high signal.

When the user continues pressing the power button PB of the input unit 130 in the power on state of the image forming apparatus, the nPOWER_OFF signal changes to a lower signal in order to turn off the image forming apparatus and is supplied to the power controller 140. In this case, the transistor Q3 of the power controller 140 is turned off so as to turn on the transistor Q1 of the switch 120. Accordingly, the DC/DC converter 101 changes to a disable state from the enable state.

The nRESET signal supplied to the power controller 140 is used to solve a problem that the image forming apparatus is rebooted due to voltage drop using the fact that the nRESET signal is maintained at a low level during a power on reset period when the CPU changes the nPOWER_OFF signal to a low signal in the power on state to turn off the image forming apparatus.

A barrier diode D1 is provided between the trigger unit 110 and the input unit 130.

The barrier diode D1 is serially connected between the trigger unit 110 and the input unit 130. Specifically, the barrier diode D1 is connected in a forward direction between the output terminal of the trigger unit 110 and the power button PB of the input unit 130. One terminal of the barrier diode D1 is connected to one terminal of the power button PB and the other terminal thereof is connected to the collector of the transistor Q3 of the power controller 140. That is, the barrier diode D1 is connected in a forward direction between the transistor Q3 and the power button PB.

When the user presses the power button PB to turn on the image forming apparatus and then releases the power button PB, the nKEY_POWER signal corresponding to 0V may be continuously input to the CPU 150, that is, the power button PB may be recognized as being continuously pressed. In this case, when the barrier diode D1 is used, the nKEY_POWER signal is immediately changed to 3.3V when the user releases the power button PB. Accordingly, the barrier diode D1 can prevent the CPU 150 from incorrectly recognizing the operation state of the power button PB.

That is, when the barrier diode D1 is not provided, the CPU 150 may recognize the power button PB as being continuously pressed even in a ready state of the image forming apparatus. Even when the DC/DC converter 101 is enabled by pressing the power button PB and then the power button PB is released, the nKEY_POWER signal corresponding to 0V is still input to the CPU 150. Accordingly, the CPU 150 may perform a control operation for turning off the image forming apparatus upon misrecognizing the power button PB as being pressed again by the user to turn off the image forming apparatus. If the barrier diode D1 is provided, however, the barrier diode D1 prevents the power controller 140 and the trigger unit 110 from being affected by an operation of releasing the power button PB after power on of the image forming apparatus. More specifically, since the transistor Q3 of the power controller 140 is turned on in the power on state, the nKEY_POWER signal maintains 0V even if the user releases the pressed power button PB, and thus the CPU 150 may misrecognize the press operation of the power button PB. However, when the barrier diode D1 is used, the voltage level of the nKEY_POWER signal is changed according to the press operation of the power button PB so that the CPU 150 can correctly recognize the press operation of the power button PB.

A diode D3 is provided between the trigger unit 110 and the switch 120.

The diode D3 is serially connected between the trigger unit 110 and the switch 120. Specifically, the diode D3 is connected in a forward direction between the output terminal of the trigger unit 110 and the base of the transistor Q1 of the switch 120.

The diode D3 prevents the collector and the emitter of the transistor Q1 of the switch 120 from being electrically connected due to excess voltage applied to the base of the transistor Q1 even when the power button PB is pressed due to a resistant component that exists on a circuit line connected to the power button PB of the input unit 130. That is, the diode D3 provides a threshold voltage to prevent the transistor Q1 of the switch 120 from being turned on by a voltage generated when the power button PB is operated.

Figure 9:
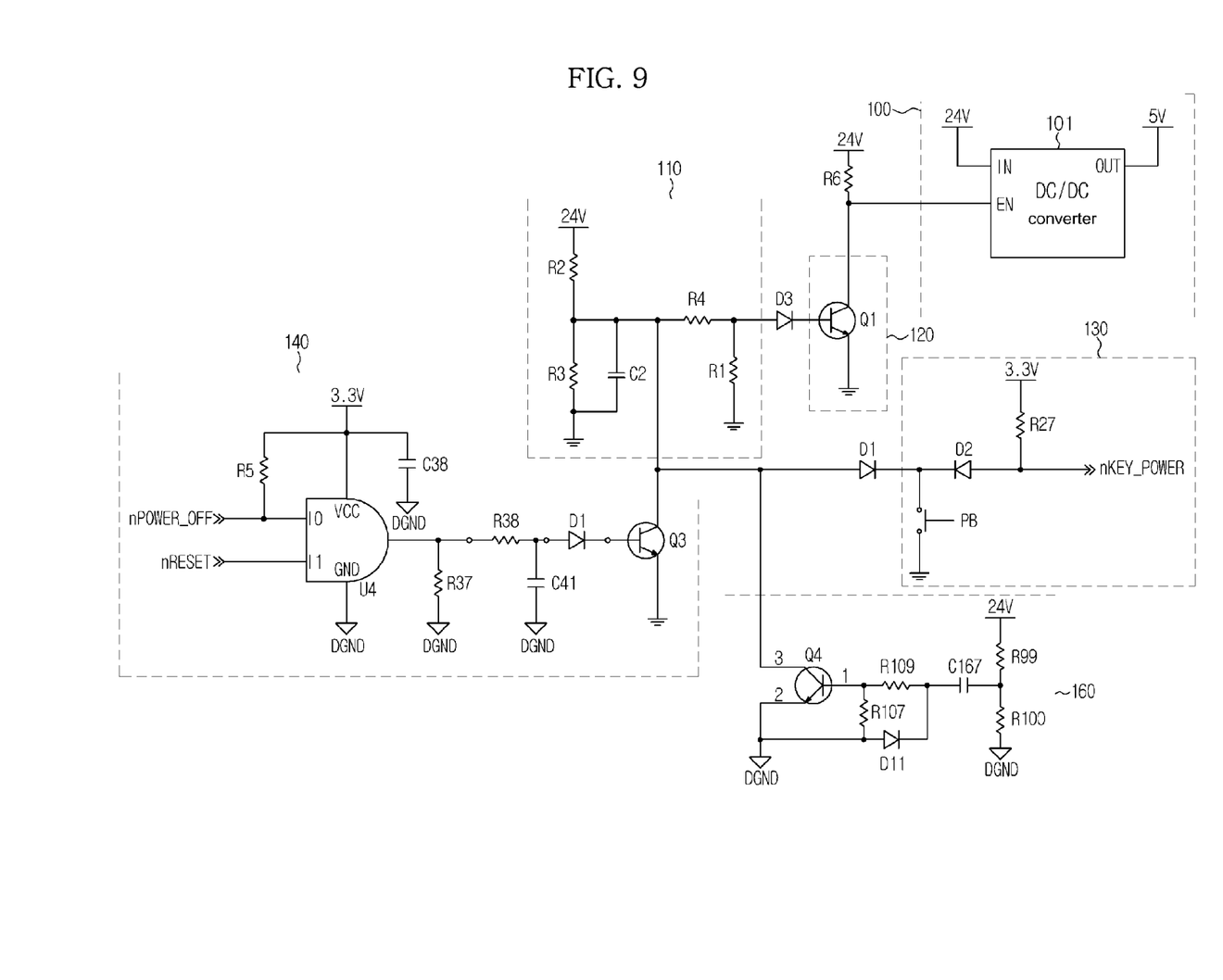
FIG. 9 is a circuit diagram of a power control apparatus according to an embodiment.

FIG. 9 is a circuit diagram of a power control apparatus according to an embodiment.

Referring to FIG. 9, the power control apparatus may include a kick start unit 160.

The kick start unit 160 is provided between the power controller 140 and the input unit 130. More specifically, the kick start unit 160 is arranged between the power controller 140 and the barrier diode D1.

The kick start unit 160 is an automatic power on circuit that automatically enables the image forming apparatus when AC power is supplied to the image forming apparatus without pressing the power button PB. When the primary DC power, 24V, supplied from the power supply is divided into 5V by resistors R99 and R100 and supplied to a capacitor C167, a transistor Q4 is turned on while the capacitor C167 is charged. Accordingly, the transistor Q1 of the switch 120 is turned off so as to enable the DC/DC converter 101 to generate the power (secondary DC power, 5V) necessary for the image forming apparatus from the primary DC power, 24V. Upon completion of charging the capacitor C167, the output terminal of the capacitor C167 is opened to turn off the transistor Q4.

While the color image forming apparatus is exemplified as an image forming apparatus to which the power control apparatus according to an embodiment is applied, embodiments are not limited thereto and can be applied to a black-and-white image forming apparatus.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A power control apparatus comprising:
    a DC/DC converter including an enable pin and being enabled or disabled according to a level of a signal input to the enable pin;
    a switch connected to the enable pin and switched to change the level of the signal input to the enable pin;
    an input unit directly connected to one terminal of the switch and including a power button to control a switching state of the switch; and
    a trigger unit to divide a DC power into a reference voltage and output a trigger signal for turning on the switch such that a signal for disabling the DC/DC converter is input to the enable pin in case of power off,
    wherein the trigger signal is output to a diode connected to the switch.

2. The power control apparatus according to claim 1, further comprising a central processing unit (CPU) to recognize an operation of the power button and a power controller to control the switching state of the switch according to a control signal of the CPU.

3. The power control apparatus according to claim 2, wherein the power controller includes a logic OR gate to receive a signal for powering off a system and a reset signal from the CPU as inputs and a transistor switched according to the output signal of the logic OR gate.

4. The power control apparatus according to claim 3, wherein the transistor includes a collector connected to an output terminal of the trigger unit and an emitter grounded.

5. The power control apparatus according to claim 4, wherein one terminal of the power button is connected to the collector of the transistor and the other terminal thereof is ground.

6. The power control apparatus according to claim 5, further comprising a barrier diode connected in a forward direction to a circuit line that connects the collector of the transistor and one terminal of the power button.

7. The power control apparatus according to claim 4, wherein the diode is connected in a forward direction to a circuit line that connects the trigger unit and the switch to prevent the DC/DC converter from being disabled when the switch is turned on according to an ON operation of the power button when the system is changed from a power off state to a power on state.

8. A power control apparatus comprising:
    a DC/DC converter including an enable pin and being enabled or disabled according to a level of a signal input to the enable pin;
    a switch to apply a first voltage level signal for disabling the DC/DC converter to the enable pin when turned on and to apply a second voltage level signal to the enable pin when turned off;
    a trigger unit connected to one terminal of the switch to divide a DC power into a reference voltage and to output a trigger signal to tune on the switch such that the first voltage level signal is input to the enable pin in a power off state of a system;
    an input unit directly connected to one terminal of the switch and including a power button to control a switching state of the switch;
    a central processing unit (CPU) to recognize an operation state of the power button of the input unit; and
    a power controller to control the switching state of the switch according to a control signal of the CPU,
    wherein the trigger signal is output to a diode connected to the switch.

9. The power control apparatus according to claim 8, wherein the trigger unit turns on the switch to disable the DC/DC converter in the power off state of the system, the CPU turns off the switch through the power controller to enable the DC/DC converter when the power button is pressed in the power off state of the system, and the CPU controls the trigger unit to turn on the switch through the power controller to disable the DC/DC converter when the power button is pressed in a power on state of the system.

10. An image forming apparatus comprising:
    a photosensitive member;
    an optical scanning unit to form an electrostatic latent image on the photosensitive member;

a developing unit to develop the electrostatic latent image formed on the photosensitive member into a developer image;

a transfer unit to transfer the developer image formed on the photosensitive member to a printing medium;

a fusing unit to fuse the developer image transferred by the transfer unit onto the printing medium;

a control board to control an operation of at least one of the photosensitive member, optical scanning unit, developing unit, transfer unit and fusing unit; and a power control apparatus to supply power to at least one of the components, wherein the power control apparatus comprises:

a DC/DC converter including an enable pin and being enabled or disabled according to a level of a signal input to the enable pin;

a switch connected to the enable pin and switched to change the level of the signal input to the enable pin;

an input unit directly connected to one terminal of the switch and including a power button to control a switching state of the switch, and a trigger unit to divide a DC power into a reference voltage and output a trigger signal for turning on the switch such that a signal for disabling the DC/DC converter is input to the enable pin in case of power off, wherein the trigger signal is output to a diode connected to the switch.

11. The image forming apparatus according to claim 10, further comprising a central processing unit (CPU) to recognize an operation of the power button and a power controller to control the switching state of the switch according to a control signal of the CPU.

12. The image forming apparatus according to claim 11, wherein the power controller includes a logic OR gate to receive a signal for powering off a system and a reset signal from the CPU as inputs and a transistor switched according to the output signal of the logic OR gate.

13. The image forming apparatus according to claim 12, wherein the transistor includes a collector connected to an output terminal of the trigger and an emitter grounded.

14. The image forming apparatus according to claim 13, wherein one terminal of the power button is connected to the collector of the transistor and the other terminal thereof is ground.

15. The image forming apparatus according to claim 14, further comprising a barrier diode connected in a forward direction to a circuit line that connects the collector of the transistor and one terminal of the power button.

16. The image forming apparatus according to claim 13, wherein the diode is connected in a forward direction to a circuit line that connects the trigger and the switch to prevent the DC/DC converter from being disabled when the switch is turned on according to an ON operation of the power button when the system is changed from a power off state to a power on state.

17. An image forming apparatus comprising:

a photosensitive member;

an optical scanning unit to form an electrostatic latent image on the photosensitive member;

a developing unit to develop the electrostatic latent image formed on the photosensitive member into a developer image;

a transfer unit to transfer the developer image formed on the photosensitive member to a printing medium;

a fusing unit to fuse the developer image transferred by the transfer unit onto the printing medium;

a control board to control an operation of at least one of the photosensitive member, optical scanning unit, developing unit, transfer unit and fusing unit; and a power control apparatus to supply power to at least one of the components, wherein the power control apparatus comprises:

a DC/DC converter including an enable pin and being enabled or disabled according to a level of a signal input to the enable pin;

a switch to apply a first voltage level signal for disabling the DC/DC converter to the enable pin when turned on and to apply a second voltage level signal to the enable pin when turned off;

a trigger unit connected to one terminal of the switch to divide a DC power into a reference voltage and to output a trigger signal to tune on the switch such that the first voltage level signal is input to the enable pin in a power off state of a system;

an input unit directly connected to one terminal of the switch and including a power button to control a switching state of the switch;

a central processing unit (CPU) to recognize an operation state of the power button of the input unit; and a power controller to control the switching state of the switch according to a control signal of the CPU, wherein the trigger signal is output to a diode connected to the switch.

18. The image forming apparatus according to claim 17, wherein the trigger unit turns on the switch to disable the DC/DC converter in the power off state of the system, the CPU turns off the switch through the power controller to enable the DC/DC converter when the power button is pressed in the power off state of the system, and the CPU controls the trigger unit to turn on the switch through the power controller to disable the DC/DC converter when the power button is pressed in a power on state of the system.

19. An image forming apparatus comprising:

a photosensitive member;

an optical scanning unit to form an electrostatic latent image on the photosensitive member;

a developing unit to develop the electrostatic latent image formed on the photosensitive member into a developer image;

a transfer unit to transfer the developer image formed on the photosensitive member to a printing medium;

a fusing unit to fuse the developer image transferred by the transfer unit onto the printing medium;

a control board to control an operation of at least one of the photosensitive member, optical scanning unit, developing unit, transfer unit and fusing unit; and a power control apparatus to supply power to at least one of the components, wherein the power control apparatus comprises:

a DC/DC converter including an enable pin and being enabled or disabled according to a level of a signal input to the enable pin;

a switch connected to the enable pin and switched to change the level of the signal input to the enable pin;

an input unit directly connected to one terminal of the switch;

a kick start unit connected to the input unit to automatically enable the image forming apparatus when alternating current (AC) power is supplied to the image forming apparatus; and a trigger unit to divide a DC power into a reference voltage and output a trigger signal for turning on the switch such that a signal for disabling the DC/DC converter is input to the enable pin in case of power off, wherein the trigger signal is output to a diode connected to the switch.

* * * * *